Aug. 23, 1932.   L. D. JONES   1,872,963
METHOD FOR SEPARATING SUBSTANCES
Original Filed April 13, 1925
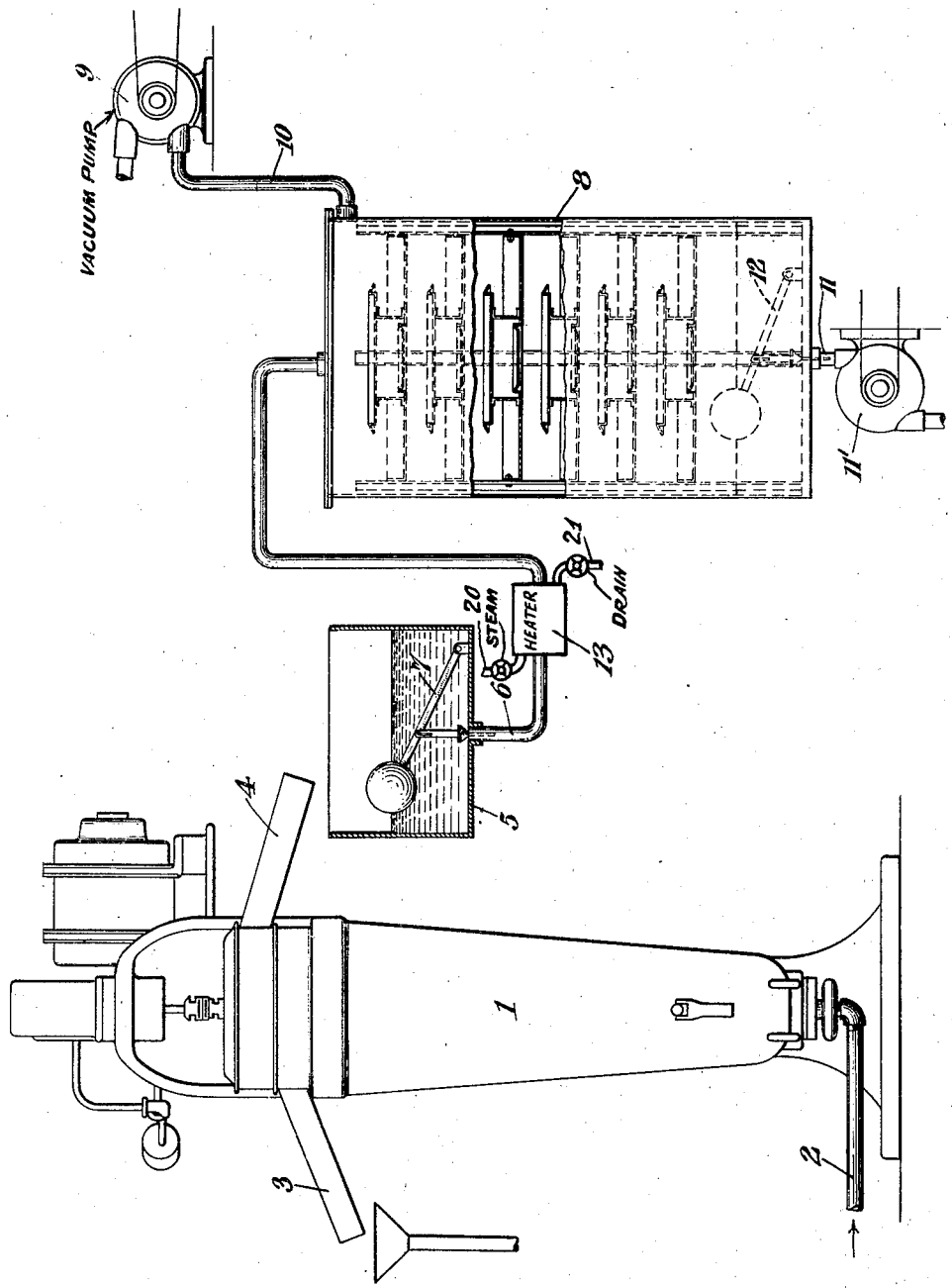
Inventor
Leo D. Jones
By his Attorneys
Kenyon & Kenyon Patented Aug. 23, 1932

1,872,963

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

METHOD FOR SEPARATING SUBSTANCES

Application filed April 13, 1925, Serial No. 22,727. Renewed February 17, 1932.

My invention relates to a method for separating substances and particularly to the removal of impurities from a substance.

In the centrifugal separation of substances into their constituents and in the centrifugal clarification of substances, a substance or a constituent of a substance that is discharged from the centrifugal machine may contain a liquid impurity that is either in solution or suspension and it may also contain a gaseous impurity that is in solution or in suspension. Such a liquid impurity may be of such a nature that even though it is in solution when the substance is discharged from the centrifugal machine it will precipitate out, for example, when the substance is cooled. Such a gaseous impurity may be in solution or, particularly if the substance is very viscous, it may be in suspension. While steps might be taken with the intention of removing such impurities at the same time that the centrifugal separation or clarification is being carried on the practical performance of such steps is in most cases impossible of accomplishment because of the conditions under which the centrifugal separation or clarification is carried out. In the purification and renovation of oil that is intended for use as an insulating medium, for example, for the submersion of high tension electric switches and transformers, centrifugal separation or clarification is carried out while the viscosity of the oil is reduced, preferably by heating the same, for example, 110° F. to 145° F. Centrifugal treatment of the oil will remove substantially all of the undissolved water and other immiscible impurities but the oil will contain dissolved water that will be precipitated out when the oil is cooled and the oil will also contain dissolved gases, some of which gases are introduced into it when it is discharged in the finely divided state from the bowl of the centrifugal separator or clarifier.

It is an object of my invention to provide a process whereby impurities remaining in a substance after it has been treated in a centrifugal separator or clarifier may be removed therefrom.

In accordance with my invention a substance that has been treated in a centrifugal separator or clarifier is subjected to reduced pressure, i. e. a pressure below that under which it was subjected to the centrifugal separating or clarifying operation, and is maintained under the influence of such reduced pressure by removal of the evolved gases and vapors until the elimination of impurities has proceeded to such extent as may be desirable or practicably possible. The reduction of pressure is carried to such a point that dissolved or suspended gaseous impurities will be withdrawn and if dissolved liquid impurities are present the pressure is reduced below that at which the impurities, that are at the temperature of the substance being treated, will boil and pass off. In the purification of insulating oil treatment in a centrifugal separator or clarifier will leave in the oil some dissolved water, a part of which would precipitate out upon cooling of the oil, and in some cases a trace of suspended water, and also dissolved gases, some of said gases having possibly been introduced when the oil was discharged in a finely divided state from the centrifugal machine. The oil that has been treated in the centrifugal separator or clarifier is then subjected to pressure that is so reduced that dissolved gases will be withdrawn and so reduced that it is below the pressure at which water and other impurities at the temperature of the oil will boil and pass off. In other words by my process immiscible impurities that cannot be removed by or that may have been introduced as a consequence of centrifugal separation or purification may be removed, such a high degree of purification being particularly desirable when the impurities are likely to assume a different state or condition or likely to produce undesirable effects under changes of pressure or temperature of the purified substance.

In accordance with my invention gaseous impurities that are in solution as well as gaseous impurities that are entrapped and become suspended in a substance when it is discharged from a centrifugal separator or clarifier, as in the case of the centrifugal separation or clarification of gum arabic and sugar solution, may be readily removed.

In the single figure of the drawing I have shown diagrammatically apparatus embodying and whereby my invention may be practised.

Referring to the drawing, the centrifugal separator or clarifier 1 is fed through the pipe 2 with a substance to be centrifugally clarified or separated. If a separation occurs impurities may be discharged through the usual outlet 3 and the substance to be purified is discharged through the usual outlet 4. The substance is collected in the tank 5 having an outlet pipe 6 controlled by the float valve 7. The outlet pipe 6 leads into a vacuum chamber 8 that may be of any desired form, preferably a form that will provide a circuitous and indirect path of flow for the substance. Vacuum is maintained within the chamber 8 by means of a vacuum pump 9 preferably connected to the tank 8 at the upper portion thereof as by the pipe 10. The substance to be purified is withdrawn from the vacuum chamber 8 through the pipe 11, the outflow of the substance from the vacuum chamber being controlled by the float valve 12, and effected by pump 11'.

The vacuum maintained by the pumps 9 and 11' operating together or separately will be sufficiently high to cause evaporation of the impurity to be removed at the temperature at which that impurity exists. If the temperature of the liquid substance entering the tank 8 is high, for example, 145° F., then the pump or pumps will have to produce a vacuum high enough to cause the impurity sought to be removed to evaporate at that temperature. As a particular instance I would mention that in the purification of oil the oil entered the vacuum tank at 140° F. and a vacuum of 29½ inches of mercury (approximately ½ inch of mercury absolute pressure) was maintained within the tank. In order that it will not be necessary to maintain too high a degree of vacuum in the tank 8 the substance entering the tank 8 may be heated as by heater 13 up to a higher temperature than that at which it leaves the centrifuge. Heater 13 may be provided with any suitable source of heat supply such as a steam inlet 20 and an outlet 21. If water is to be removed from oil either the temperature within the tank 8 or the degree of vacuum within the tank 8 or both temperature and vacuum are preferably slightly higher than would be necessary to cause water that is not dissolved in or mixed with oil to evaporate.

While I have described my invention with reference to particular substances and apparatus I do not intend that my invention shall be limited to the details referred to but intend that it shall include such variations and modifications as fall within the hereunto appended claims.

What I claim and desire to secure by Letters Patent of the United States is:

1. The process of purifying oil that contains impurities including dissolved and suspended water and that has a vapor pressure not substantially higher than the vapor pressure of water under temperature and pressure conditions at which water will vaporize from the oil, and thereby producing oil substantially free of suspended and dissolved water and gases for uses in which suspended and dissolved water and gas impair the effect and stability of the oil, which comprises centrifugally separating immiscible impurities from the oil while it is heated to a sufficiently high temperature to reduce its viscosity, and then subjecting the centrifuged oil without substantial reduction in temperature to a pressure sufficiently low to effect removal therefrom in the form of vapor or gas of dissolved water and gaseous impurities that exist in the oil after the centrifugal separating step, while maintaining the temperature and pressure at such values that vaporization of the oil is substantially avoided.

2. The process of purifying oil that contains impurities including dissolved and suspended water and that has a vapor pressure not substantialy higher than the vapor pressure of water under temperature and pressure conditions at which water will vaporize from the oil, and thereby producing oil substantially free of suspended and dissolved water and gases for uses in which suspended and dissolved water and gas impair the effect and stability of the oil, which comprises centrifugally separating immiscible impurities from the oil while it is heated to a sufficiently high temperature to reduce its viscosity, and then subjecting the centrifuged oil to such conditions of temperature and pressure as will cause dissolved water and gaseous impurities that exist in the oil after the centrifugal separating step to pass off as vapors and gases, while maintaining the temperature and pressure at such values as to avoid substantial loss of or injury to the oil.

3. The process of purifying oil that contains dissolved and suspended water, and that has a vapor pressure not substantially higher than the vapor pressure of water under temperature and pressure conditions at which water will vaporize from the oil, and thereby producing oil substantially free of suspended and dissolved water and gases for uses in which such impurities impair the effect and stability of the oil, which comprises centrifugally separating immiscible impurities from the oil while it is heated to a sufficiently high temperature to reduce its viscosity, and then subjecting the centrifuged oil in a heated state to a pressure lower than the pressure at which it was centrifugally treated and sufficiently low to effect removal therefrom in the form of vapor or gas of dissolved water and gaseous impurities that exist in the oil after the centrifugal separating step, while maintaining the temperature and pressure at such values as to avoid substantial loss of or injury to the oil.

4. The process of purifying oil that contains impurities of the character that impairs the value of the oil for electrical insulating and dielectric use including suspended and dissolved water, and thereby producing oil for use as electrical insulating or dielectric oil and which is substantially free of dissolved water and gas, which comprises centrifugally separating immiscible impurities from the oil while it is heated to a sufficiently high temperature to reduce its viscosity, and then subjecting the centrifuged oil to such conditions of temperature and pressure as will cause the removal therefrom in the form of vapor or gas of dissolved water and gaseous impurities that exist in the oil after the centrifugal separating step, while maintaining the temperature and pressure at such values as to avoid substantial loss of or injury to the oil.

5. The process of purifying oil that contains impurities of the character that impairs the value of the oil for electrical insulating and dielectric use including suspended and dissolved water, and thereby producing oil for use as electrical insulating or dielectric oil and which is substantially free of dissolved water and oxygen, which comprises centrifugally separating immiscible impurities from the oil while it is heated to a sufficiently high temperature to reduce its viscosity, and then subjecting the centrifuged oil to such conditions of temperature and pressure as will cause the removal therefrom in the form of vapor or gas of dissolved water and oxygen that exist in the oil after the centrifugal separating step, while maintaining the temperature and pressure at such values as to avoid substantial loss of or injury to the oil.

6. The process of purifying oil that contains impurities including dissolved and suspended water and solid particles and that has a vapor pressure not substantially higher than the vapor pressure of water under temperature and pressure conditions at which water will vaporize from the oil, and thereby producing oil substantially free of solid particles and of suspended and dissolved water and gases for uses in which solid particles and suspended and dissolved water and gas impair the effect and stability of the oil, which comprises centrifugally separating immiscible impurities including solid particles and water from the oil while it is heated to a sufficiently high temperature to reduce its viscosity, and then subjecting the centrifugal oil to such conditions of temperature and pressure as will cause dissolved water and gaseous impurities that exist in the oil after the centrifugal separating step to pass off as vapors and gases, while maintaining the temperature and pressure at such values as to avoid substantial loss of or injury to the oil.

In testimony whereof, I have signed my name to this specification.

LEO D. JONES.